June 3, 1958  H. B. SCHULTZ  2,837,061
OPEN CENTER POPPET TYPE VALVE
Filed June 1, 1953  3 Sheets-Sheet 3

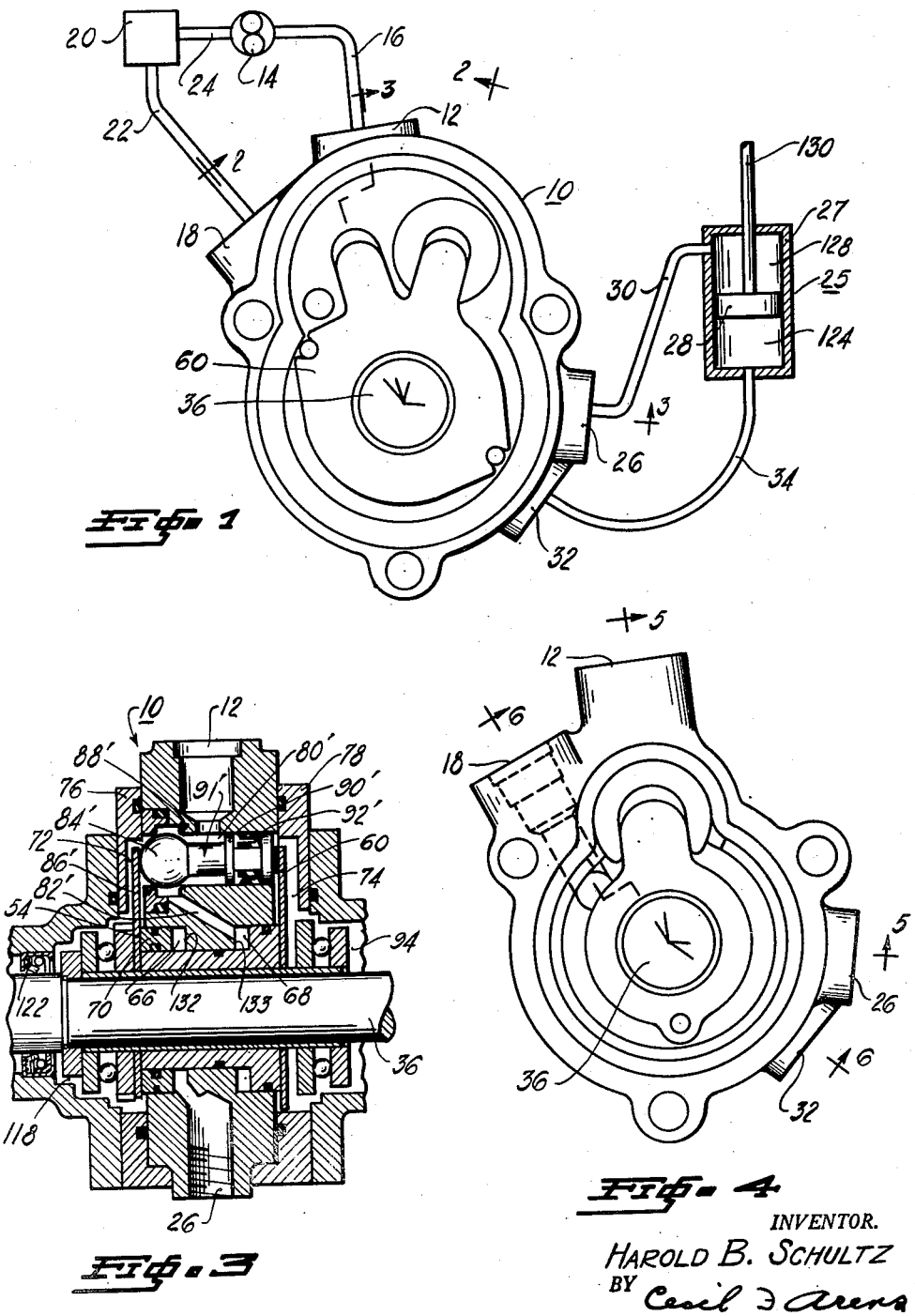

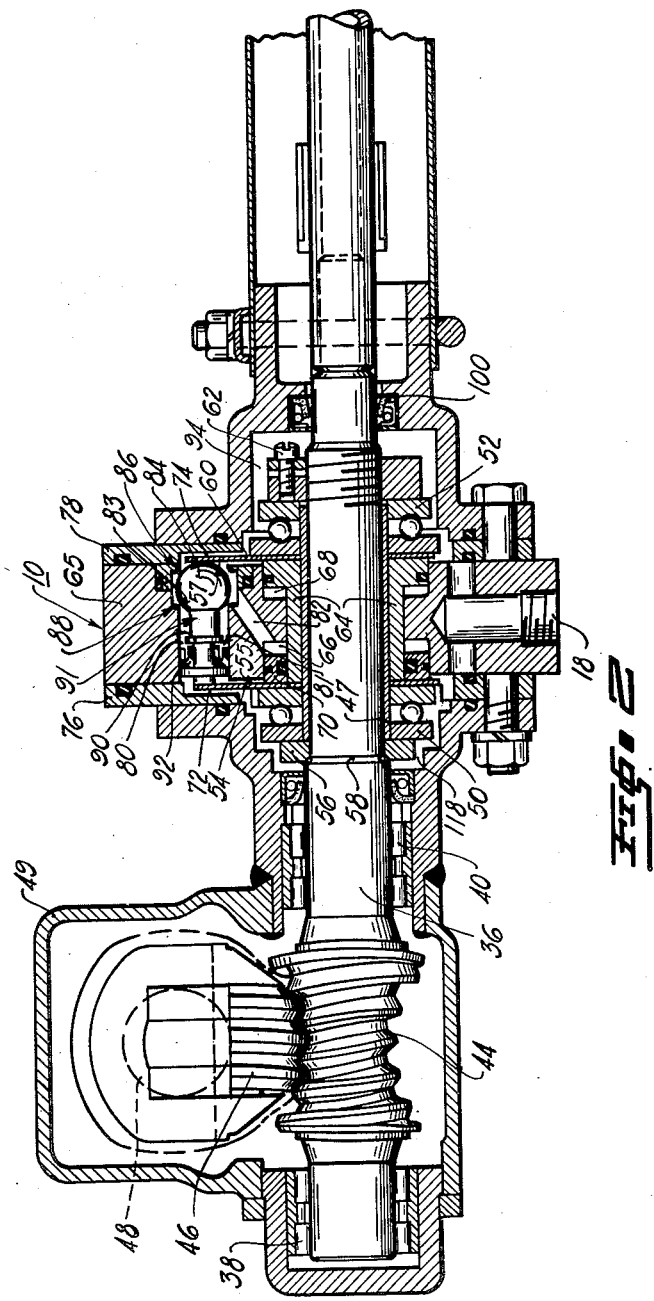

INVENTOR.
HAROLD B. SCHULTZ
BY
ATTORNEY 2,837,061
Patented June 3, 1958

United States Patent Office 2,837,061

OPEN CENTER POPPET TYPE VALVE

Harold B. Schultz, South Bend, Ind., assignor to Bendix Aviation Corporation, South Bend, Ind., a corporation of Delaware Application June 1, 1953, Serial No. 358,873

15 Claims. (Cl. 121—46.5)

This invention relates to fluid control devices and, more particularly, to valves.

It is an object of this invention to provide a novel valve for controlling fluid flow and pressure to a double-acting cylinder and piston.

An important object of the invention is to provide a valve having an inlet port for receiving fluid pressure, three ports connected to the inlet port, and valve means interposed between the respective ports of the valve to control communication therebetween, the valve means consisting of two valve elements each capable of seating on two valve seats so that each valve element can control communication between the inlet port and two of the other ports of the valve.

Another object of the invention lies in the provision of valve elements which are seated on their respective valve seats by a mechanical force and unseated therefrom by fluid pressure.

A further object of the invention is to utilize spherical, free-floating valve elements capable of being seated on either one of two diametrically opposite valve seats.

The above and other objects and features of the invention will become apparent from the following description of the apparatus taken in connection with the accompanying drawings which form a part of this specification, and in which:

Figure 1 shows the valve of the invention as used in one type of fluid system;

Figure 2 is a sectional view of the valve taken along line 2—2 of Figure 1 and shown in connection with an automotive steering apparatus;

Figure 3 is a sectional view of the valve taken along line 3—3 of Figure 1;

Figure 4 is a plan view of a modified form of the valve;

Figure 5:
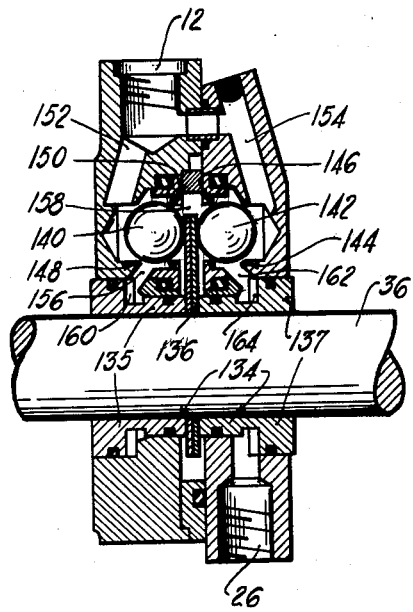
Figure 5 is a sectional view of the valve of Figure 4 taken along line 5—5.

Referring to Figure 1, the fluid system shown includes a fluid control device 10 having an inlet port 12 connected to any suitable pump 14 by conduit 16. A return or outlet port 18 is connected to a reservoir 20 by a conduit 22, and the reservoir is, in turn, connected to the inlet side of the pump 14 by a conduit 24. An outlet or working port 26 is connected to one side of a double-acting power unit 25, comprising a cylinder 27 and piston 28, by a conduit 30. The other side of the power unit is connected to an outlet or working port 32 of the fluid control device through a conduit 34.

Referring now to Figure 2, the fluid control device 10 is shown associated with a steering apparatus for an automobile or other vehicle. Steering wheel shaft 36 is journaled at its lower end in bearings 38 and 40. An hour glass worm gear 44, carried on steering wheel shaft 36, engages roller sector gear 46 to impart rotary motion to shaft 48 which is, in turn, connected to the steering linkage, not shown, of an automobile or other vehicle to achieve turning. Housing 49 encases the gears 44 and 46 and also provides support for the shaft 48.

Abutting each side of fluid control device 10 and located at each end of sleeve 47 are thrust bearings 50 and 52. Thrust bearing 50 is held securely against a flat pressure plate 54 by collar 56 which, in turn, abuts shoulder 58 of steering wheel shaft 36. Thrust bearing 52 is in a like manner held against a pressure plate 60 by means of lock nut 62 threaded onto steering wheel shaft 36. An axially extending collar 64, which forms a part of the fluid control device 10, is secured between pressure plates 54 and 60 and, therefore, fixed with respect to axial movement of the shaft 36. It is, however, free to move axially relative to the body 65 of fluid control device 10. The steering wheel shaft 36 is free to move axially for reasons as will be hereinafter given. Cavities 72 and 74 are formed between the body 65 of fluid control device 10 and cover plates 76 and 78. These cavities permit the collar 64, which is axially movable with respect to body 65, and the entire combination of steering wheel shaft 36, sleeve 47, collar 56, thrust bearings 50 and 52, lock nut 62, and the pressure plates 54 and 60 to move to the right or left as a unit relative to the body 65; movement being limited by abutment of pressure plates 54 and 60 with surfaces 55 and 57, respectively, of body 65.

The construction and arrangement of the worm gear 44 and roller gear 46 are such that rotation of the steering shaft 36 will turn the shaft 48 provided the resistance offered to steering does not reach a predetermined value. Under normal steering conditions this resistance is always at or above the predetermined value. With resistance to rotation of the shaft 48 above the predetermined value, the shaft 36 will shift axially to the left or right thus actuating the valve. The details of the worm gear and roller sector gear form no part of the present invention and are described and claimed in a separate application.

Annular channels 66 and 68, circumventing the collar 64, are formed between the collar and body 65. One side of channel 66 is formed by a removable annular ring 70 which permits the collar 64 and body 65 to be assembled, after which the ring 70 is placed in position.

Connecting annular channel 66 to bore 80 is a passage 82. Valve element 84, positioned within bore 80, is capable of seating on either one of two diametrically opposite annular valve seats 86 and 88, but is normally unseated from both. In this particular embodiment of the fluid control device the valve element is shown as a partial sphere. It is welded or otherwise securely fastened to piston 90, which can reciprocate in the bore 80, to form a single, composite valve member 91. The effective areas of opposing annular surfaces 81 and 83 of the valve member are the same so that any pressure existing in bore 80 will simultaneously act on these two surfaces to produce a condition of equilibrium.

In neutral or open position the valve element is prevented from seating on valve seat 86 by abutment with pressure plate 60 and on valve seat 88 by abutment of the piston 90 with pressure plate 54. Seal 92, encircling one end of piston 90, prevents communication between bore 80 and cavity 72. Since one end of valve member 91 abuts pressure plate 54 and its other end abuts pressure plate 60, the combination of piston 90 and valve element 84 will move to the right or left with the pressure plates and thereby seat valve element 84 on either valve seat 86 or 88. When valve element 84 is in neutral position, that is, unseated from its valve seats, there is fluid communication between bore 80, which is connected to inlet port 12, and return port 18 via cavity 74 and annular chamber 94. Annular chamber 94 also serves to encase thrust bearing 52 and lock nut 62. Packing gland 100 insures a fluid tight seal between chamber 94 and the atmosphere.

Figure 3, taken through another portion of the fluid control device, shows a second valve member 91' identical to valve member 91. Note, however, that valve element 84' is now on the opposite side of fluid control device 10, and the passage 82' is connected to annular channel 68 instead of 66 as was passage 82 in Figure 2. The valve member 91' is composed of a piston 90', reciprocable in bore 80', and the valve element 84' securely fastened to the piston and capable of seating on either one of two diametrically opposite annular valve seats 86' and 88'. Ring seal 92' encircles one end of piston 90' to prevent communication between fluid in bore 80' and cavity 74. Fluid in bore 80' can flow past valve seats 88' and 86' through cavity 72 and annular chamber 118, which encases thrust bearing 50 and collar 56, to return port 18. Packing gland 122 prevents leakage from chamber 118. Inlet port 12 is connected to bore 80' shown in Figure 3 and also to bore 80 as was pointed out in connection with Figure 2. The annular channel 66 is connected to working port 26 as best shown in Figure 3 and annular channel 68 is connected to working port 32 in a similar manner at another point on the outer periphery of the fluid control device 10 as shown in Figure 1.

With the valve parts in the position shown in Figures 2 and 3, at which time the valve elements 84 and 84' are unseated from their respective seats, fluid from the pump 14 entering the inlet port 12 passes into bores 80 and 80'. Fluid flows out of bore 80 (Figure 2) past valve seats 88 and 86, through cavity 74 and chamber 94 to return port 18. It is also possible for the fluid in bore 80 to flow past valve seat 88 through passage 82 and annular channel 66 to outlet port 26. Likewise, in Figure 3, fluid flowing through bore 80' will flow past valve seats 88' and 86', through cavity 72 and chamber 118 to return port 18; and it is possible for the fluid to flow past valve seat 88', through passage 82', and annular channel 68 to outlet port 32. Since pressure in outlets 26 and 32 emanates from a common pressure source and since this pressure is applied to the opposite sides of a movable piston, a state of equilibrium exists when the valve elements are unseated from their respective seats and no fluid flows from outlets 26 and 32.

Assume, now, that in Figure 2 the steering wheel shaft 36 is turned. When resistance offered to turning reaches the predetermined value mentioned above, the steering wheel shaft 36, which is free to move axially, will shift to the right or left depending upon the direction of turning. Suppose that the steering wheel shaft 36 is turned so as to cause worm gear 44 and, consequently, the entire shaft to move axially to the right. The combination of collar 56, thrust bearings 50 and 52, collar 64, lock nut 62, and pressure plates 54 and 60 will also move to the right, since, as explained above, they are journaled to the steering wheel shaft 36 as a unit. The movement of pressure plates 54 and 60 to the right will cause valve members 91 and 91' to move to the right also and will, consequently, cause valve elements 84 and 84' to seat on valve seats 86 and 88' respectively. In this position it can be seen that inlet pressure is cut off from both return port 18 and working port 32, the latter of which communicates with annular channel 68. The only port receiving pressure from inlet port 12 is working port 26. Fluid can flow past valve seat 88 and into passage 82 which is, in turn, connected to working port 26 through annular channel 66. It should be noted that with the valve element 84' in the aforesaid position communication is established between working port 32 and return port 18 via channel 68, passage 82', valve seat 86', and cavity 72. The result of the arrangement of connections outlined above is this: Fluid will flow from inlet port 12 to working port 26 and into chamber 128 to force the piston 28 of power unit 25 to move downwardly. The fluid in chamber 124 of the power unit will be exhausted via conduit 34 and working port 32 which is connected to return port 18 as explained and finally to reservoir 20 via conduit 22. Piston rod 130 shown in Figure 1 is connected to shaft 48 (Figure 2) to assist in turning the vehicle wheels by a suitable linkage, not shown. This linkage is connected to the work shaft 48 to provide follow-up action on the control valve. It should be noted that under the conditions just described a differential of pressures exists in annular channels 66 and 68 with the greater pressure existing in channel 66. This greater pressure in channel 66 acts against the ring 70 to return the valve to neutral position at which time the pressure in both channels 66 and 68 will be equal since they are again connected to a common pressure source. The effective areas of surfaces 132 and 133 (Figure 3) are the same so that when the pressures in the two channels are equal, a condition of equilibrium will exist and the valve members will move neither to the right nor left. Therefore, when the force tending to move the steering wheel is removed, the fluid control device will automatically return to neutral position where the valve elements are off their respective seats. If shaft 36 is forced to the left, the process is reversed and pressure is applied in chamber 124 instead of chamber 128 in the cylinder 27 to assist in turning the wheels of the vehicle in the other direction. That is, as the steering shaft of the vehicle is turned either way, the valve actuates the double-acting power unit 25, which is connected to the steering mechanism in a manner not shown, to assist in the turning.

Referring now to Figures 4 and 5 showing a modified form of the invention, it can be seen that the inlet and working ports corresponding to those of Figure 1 are identically numbered. The valve is used in the same hydraulic system as that shown in Figure 1.

Figure 6:
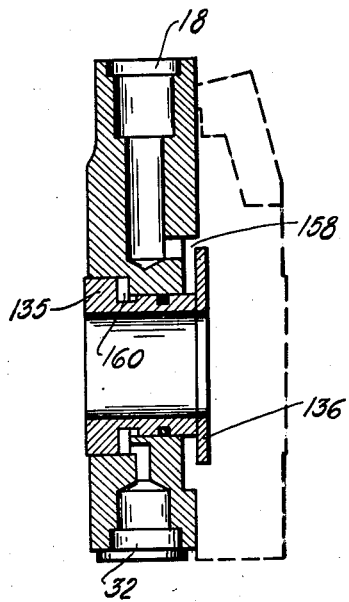
Figure 6 is a sectional view of the valve of Figure 4 taken along line 6—6.

In Figure 5 it can be seen that a two piece movable collar 134 is carried on a steering wheel shaft such as 36 in Figure 2. To facilitate assembly, the collar 134 comprises two flanged sleeves 135 and 137 held together between bearings not shown, similar to bearings 50 and 52, as shown in Figure 2. A single pressure plate 136, clamped between sleeves 135 and 137, extends radially from collar 134 and is interposed between valve elements 140 and 142. Valve element 142 is capable of seating on either one of the two diametrically opposite annular valve seats 144 and 146; and valve element 140 is likewise capable of seating on annular valve seat 148 or diametrically opposite annular valve seat 150. In neutral position when valve elements 140 and 142 are unseated from their respective valve seats, fluid at the inlet port 12 can pass through passages 152 and 154. Fluid flowing through passage 152 can flow past valve seats 148 and 150 into annular channel 158 to return port 18 (Figure 6); or it can flow past valve seat 148, through passage 156 and annular channel 160, to working port 32. Fluid flowing through passage 154 can flow through annular channel 158 or it can flow past valve seat 144, through passage 162 and channel 164, to working port 26. It should be noted that in this valve the valve elements are normally unseated from seats 150 and 146 by abutment with pressure plate 136 and from seats 148 and 144 by pressure from the inlet port 12 acting on the outward surface of the spheres.

If the movable collar 134 shifts to the right, valve element 142 will be seated on seat 144 by pressure plate 136 and valve element 140 will be seated on seat 150 by pressure from the inlet port. This will establish an exclusive connection between working port 32 and inlet port 12 and between working port 26 and return port 18. Thus, the same result is brought about by moving the movable collar 134 in the present invention to the right as was obtained by moving collar 64 in Figure 2 to the right. This modified form of the valve is also returned to neutral position by a differential in pressure existing in annular channels 160 and 164 when the rotative force applied to the shaft is removed.

Although this invention has been described in connection with certain specific embodiments, it is not limited thereto; and the principles set out are susceptible of numerous other applications as will ready appear to persons skilled in the art.

I claim:

1. A valve device comprising a body having an inlet port connected to a return port and to both a first working port and a second working port, a member journaled in said body and reciprocable therein, two annular channels formed between said body and said member connecting the inlet port with said working ports, and valve means for controlling communication between said ports, said valve means comprising first and second valve elements, two diametrically opposite valve seats associated with each valve element and between which each valve element is interposed, and a pressure plate radially outwardly extending from said reciprocable member for seating each of said valve elements on one of its respective valve seats, each of the valve elements being seated on its other seat by pressure from the inlet port, said valve elements having a neutral position in which they are unseated from their respective valve seats by a balance between the influences of said pressure plate and said inlet pressure, said pressure plate being urged to a position whereby the valve elements can assume said neutral position when a differential of pressure exists in the said two channels, said valve elements being arranged such that when the first valve element is seated on its said one seat, the second valve element is seated on its said other seat respectively to allow exclusive communication between the inlet port and said first working port and between said second working port and said return port, and when said first valve element is seated on its said other seat, said second valve element is seated on its said one seat respectively to allow exclusive communication between the inlet port and said second working port and between said first working port and the return port.

2. A valve device comprising a body having an inlet port connected to a return port and to both a first working port and a second working port, a member journaled in said body and reciprocable therein, two annular channels formed between said body and said member connecting the inlet port with said working ports, and valve means for controlling communication between said ports, said valve means comprising first and second free-floating valve elements arranged eccentrically of said member, each of said valve elements being associated with one of said working ports, two diametrically opposite valve seats associated with each valve element and between which each valve element is interposed, one of said two valve seats associated with each valve element being interposed between the inlet port and said associated working port and the other of said valve seats being interposed between the return port and said associated working port, and two pressure plates radially outwardly extending from said reciprocable member and bearing against oppositely disposed ends of said valve elements for seating said valve elements on their respective seats, said valve elements having a neutral position in which they are unseated from their respective valve seats by a balance between the influences of said pressure plates, said pressure plates urging said valve elements toward said neutral position when a differential of pressure exists in the said two annular channels, said valve element being arranged such that when the first valve element is seated on its said one seat, the second valve element is seated on its said other seat respectively to allow exclusive communication between the inlet port and said first working port and between said second working port and said return port, and when said first valve element is seated on its said other seat, said second valve element is seated on its said one seat respectively to allow exclusive communication between the inlet port and said second working port and between said first working port and the return port.

3. A valve device comprising a body having an inlet port connected to a return port and to both a first working port and a second working port, a member journaled in said body and reciprocable therein, and valve means for controlling communication between said ports, said valve means comprising first and second valve elements, two diametrically opposite valve seats associated with each valve element and between which each valve element is interposed, and a force-transmitting member outwardly extending from said reciprocable member for seating each of said valve elements on one of its respective seats, each of the valve elements being seated on its other seat by pressure from the inlet port, said valve elements having a neutral position in which they are unseated from their respective seats by a balance between the influences of said force-transmitting member and said pressure from the inlet port, said valve means being such that when the first valve element is seated on its said one seat, the second valve element is seated on its said other seat respectively to allow communication between the inlet port and said first working port and between said second working port and said return port, and when said first valve element is seated on its said other seat, said second valve element is seated on its said one seat respectively to allow communication between the inlet port and said second working port and between said first working port and the return port.

4. A valve device comprising a body having an inlet port connected to a return port and to both a first working port and a second working port, a member journaled in said body and reciprocable therein, and valve means for controlling communication between said ports, said valve means comprising first and second free-floating valve elements arranged eccentrically of said member, each of said valve elements being associated with one of said working ports, two diametrically opposite valve seats associated with each valve element and between which each valve element is interposed, a first of said valve seats associated with each valve element being interposed between the inlet port and said associated working port and a second of said valve seats being interposed between the return port and said associated working port, and two force-transmitting members outwardly extending from said reciprocable member, said force-transmitting members bearing against oppositely disposed ends of said valve elements for seating said valve elements on their respective seats, said valve elements having a neutral position in which they are unseated from their respective seats by a balance between the influences of said force-transmitting members, said valve means being such that when the first valve element is seated on its said first seat, the second valve element is seated on its said second seat respectively to allow communication between the inlet port and said first working port and between said second working port and said return port, and when said first valve element is seated on its said second seat, said second valve element is seated on its first seat respectively to allow communication between the inlet port and said second working port and between said first working port and the return port.

5. A valve device comprising a body having an inlet port connected to a return port and to both a first working port and a second working port, and valve means for controlling communication between said ports, said valve means comprising first and second valve elements, two valve seats associated with each valve element, and means interposed between said valve elements for seating each of the valve elements on one of its respective valve seats, each of the valve elements being seated on its other seat by pressure from the inlet port, said valve means being such that when the first valve element is seated on its said one seat, the second valve element is seated on its said other seat respectively to allow communication between the inlet port and said first working port and between said second working port and said return port, and when said first valve element is seated on its said other seat, said second valve element is seated on its said one seat respectively to allow communication between the inlet port and said second working port and between said first working port and the return port.

6. A valve device comprising a body having an inlet port connected to a return port and to both a first working port and a second working port, an actuating member slidable axially of said body, and valve means for controlling communication between said ports, said valve means comprising first and second free-floating valve elements arranged eccentrically of said actuating member, each of said valve elements being associated with one of said working ports, two valve seats associated with each valve element, a first of said valve seats associated with each valve element being interposed between the inlet port and said associated working port and a second of said valve seats being interposed between the return port and said associated working port, and two force-applying members for seating said valve elements on their respective valve seats, one of said force-applying members abutting said first valve element and the other of said force-applying members abutting said second valve element, said valve means being such that when the first valve element is seated on its said first seat, the second valve element is seated on its said second seat respectively to allow communication between the inlet port and said first working port and between said second working port and said return port, and when said first valve element is seated on its said second seat, said second valve element is seated on its said first seat respectively to allow communication between the inlet port and said second working port and between said first working port and the return port.

7. A valve device comprising a body having an inlet port connected to a return port and to each of two working ports, valve means comprising two free-floating valve elements and two oppositely facing valve seats associated with each valve element for controlling communication between said ports, a reciprocable member journaled in said body, two channels formed between the body of said valve device and said reciprocable member for connecting said working ports to the valve means, and a pressure plate outwardly extending from said reciprocable member for seating each of said valve elements on one of its associated seats, each of said valve elements being seated on its other seat by pressure from the inlet port, said pressure plate being urged to a neutral position whereby the valve elements are seated on neither of their associated seats when a differential of pressure exists in the said two channels.

8. A valve device including a body having an inlet port connected to a return port and to each of two working ports, valve means interposed between said ports for controlling communication therebetween and comprising two free-floating valve elements and two oppositely facing valve seats associated with each valve element, a reciprocable member journaled in said body, two channels formed between the body of said valve device and said reciprocable member, and two pressure plates projecting from said reciprocable member and bearing against oppositely disposed ends of said valve elements for simultaneously seating said valve elements on their associated seats, said pressure plates being urged to neutral position whereby the valve elements are seated on neither of their associated seats when a differential of pressure exists in the said two channels.

9. A valve device comprising a body having an inlet port connected to a return port and to each of two working ports, valve means comprising two valve elements and two valve seats associated with each valve element for controlling communication between said ports, a reciprocable member journaled in said body, and a force-applying member outwardly extending from said reciprocable member for seating each of said valve elements on one of its associated seats, each of said valve elements being seated on its other associated seat by pressure from said inlet port, said valve elements having a neutral position in which they are unseated from either of the valve seats by a balance between the influences of said force-applying member and said pressure from the inlet port.

10. A valve device comprising a body having an inlet port connected to a return port and to each of two working ports, valve means comprising two free-floating valve elements and two valve seats associated with each valve element for controlling communication between said ports, a reciprocable member journaled in said body, and two force-applying members projecting from said reciprocable member and bearing against oppositely disposed ends of said valve elements for seating said valve elements on their associated seats, said valve elements having a neutral position in which they are unseated from their associated valve seats by a balance between the influences of said force-applying members.

11. A valve device including an inlet port connected to a pressure source, three ports normally connected to the inlet port, and valve means interposed between the inlet and latter-mentioned ports to control communication therebetween, said valve means comprising two free-floating valve elements and two valve seats associated with each valve element, each of said valve elements being seated on its one seat by a mechanical force and its other seat by fluid pressure acting on one face of the valve element.

12. A valve device including a housing member, an actuating member slidable axially of said housing member, an inlet port connected to a return port and to each of two working ports, and valve means interposed between said ports to control communication therebetween, said valve means comprising two substantially spherical, free-floating valve elements arranged eccentrically of the axis of said actuating member, a first valve seat interposed between the inlet port and a first of said working ports, a second valve seat interposed between said first working port and said return port, a first of said valve elements being seatable on said first and second valve seats, a third valve seat interposed between the inlet port and a second of said working ports, and a fourth valve seat interposed between said second-working port and said return port, a second of said valve elements being seatable on said third and fourth valve seats, said valve means being such that when said first valve element is seated on said first seat, said second valve element is seated on said fourth seat, and when said first valve element is seated on said second seat, said second valve element is seated on said third seat and a transversely projecting element carried by said actuating member, said element bearing against each valve element for simultaneously seating both valve elements against their respective seats.

13. A valve device including a housing member, an actuating member slidable axially of said housing member, an inlet port connected to a return port and to each of two working ports, and valve means for controlling communication between said ports, said valve means comprising two substantially spherical, free-floating valve elements arranged eccentrically of the axis of said actuating member, two substantially spherical valve seats associated with each valve element, and transversely projecting means carried by said actuating member for seating said valve elements on their respective seats, said one valve element prohibiting communication between the inlet port and one of said working ports when seated on its one seat and between the inlet port and said return port when seated on its other seat, said other valve element prohibiting communication between the inlet port and the other of said working ports when seated on its one seat and between the inlet port and said return port when seated on its other seat.

14. A valve device including a housing member, an actuating member slidable axially of said housing member, an inlet port connected to a pressure source, three ports normally connected to the inlet port, and valve means interposed between the inlet and latter-mentioned ports to control communication therebetween, said valve means comprising two substantially spherical, free-floating valve elements arranged eccentrically of the axis of said actuating member, two substantially spherical valve seats associated with each valve element, said one valve element controlling communication between the inlet port and a first and second of the latter-mentioned ports, said other valve element controlling flow between the inlet port and said second and a third of the latter mentioned ports, and transversely projecting means carried by said actuating member for seating said valve elements on their respective seats.

15. A valve device including a housing member, an actuating member slidable axially of said housing member, an inlet port connected to a return port and to each of two working ports, and valve means interposed between said ports to control communication therebetween, said valve means comprising two substantially spherical, free-floating valve elements arranged eccentrically of the axis of said actuating member, two substantially spherical valve seats associated with each valve element and on which each valve element is seatable to thereby effectuate the said control, and means carried by said actuating member for seating said valve elements on their respective seats.

References Cited in the file of this patent

UNITED STATES PATENTS

| | | |
|---|---|---|
| 1,928,452 | Haywood | Sept. 22, 1933 |
| 1,980,144 | Siena | Nov. 6, 1934 |
| 1,992,048 | Temple | Feb. 19, 1935 |
| 2,432,721 | Brown | Dec. 16, 1947 |
| 2,634,708 | Davis | Apr. 14, 1953 |
| 2,644,426 | Moore | July 7, 1953 |
| 2,667,897 | Huntington | Feb. 2, 1954 |